US008539560B2

(12) United States Patent
Angaluri et al.

(10) Patent No.: US 8,539,560 B2
(45) Date of Patent: Sep. 17, 2013

(54) CONTENT PROTECTION USING AUTOMATICALLY SELECTABLE DISPLAY SURFACES

(75) Inventors: Srihari V. Angaluri, Raleigh, NC (US); Gary D. Cudak, Creedmoor, NC (US); Christopher J. Hardee, Raleigh, NC (US); Randall C. Humes, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 12/822,741

(22) Filed: Jun. 24, 2010

(65) Prior Publication Data

US 2011/0321143 A1  Dec. 29, 2011

(51) Int. Cl.
*G06F 7/04* (2006.01)

(52) U.S. Cl.
USPC .......... 726/6; 726/4; 726/21; 726/27; 726/28; 715/781; 715/803; 434/314

(58) Field of Classification Search
USPC ............... 726/4, 6, 21, 27, 28; 715/781, 803; 434/314
See application file for complete search history.

(56) References Cited

U.S. PATENT DOCUMENTS

| | | | |
|---|---|---|---|
| 5,912,721 A * | 6/1999 | Yamaguchi et al. | 351/210 |
| 6,459,446 B1 | 10/2002 | Harman | |
| 6,552,850 B1 * | 4/2003 | Dudasik | 359/486.02 |
| 6,578,962 B1 | 6/2003 | Amir et al. | |
| 6,742,901 B2 * | 6/2004 | Kimura et al. | 353/122 |
| 6,773,119 B2 * | 8/2004 | Kimura et al. | 353/122 |
| 6,785,406 B1 * | 8/2004 | Kamada | 382/117 |
| 6,968,565 B1 * | 11/2005 | Slaney et al. | 725/10 |
| 7,209,557 B2 | 4/2007 | Lahiri | |
| 7,774,851 B2 * | 8/2010 | Singh et al. | 726/26 |
| 2009/0273562 A1 | 11/2009 | Baliga et al. | |
| 2009/0307601 A1 | 12/2009 | Kumhyr et al. | |
| 2010/0005526 A1 * | 1/2010 | Tsuji et al. | 726/21 |

OTHER PUBLICATIONS

Paul Dietz, Ramesh Raskar, Shane Booth, Jeroen van Baar, Kent Wittenburg, Brian Knep, "Multi-projectors and implicit interaction in persuasive public displays", Proceedings of the working conference on Advanced visual interfaces, May 25-28, 2004, Gallipoli, Italy [retrieved from ACM database on Jun. 7, 2012].*

6.C. Pinhanez, "The Everywhere Displays Projector: A Device to Create Ubiquitous Graphical Interfaces," Proc. UbiComp 2001: Ubiquitous Computing, LLCS 2201, Springer-Verlag, Berlin, 2001, pp. 315-331; [retrieved fron SpringerLink database on Jun. 7, 2012].*

(Continued)

*Primary Examiner* — Aravind Moorthy
*Assistant Examiner* — Joseph Pan
(74) *Attorney, Agent, or Firm* — Thomas E. Tyson; Jeffrey L. Streets

(57) ABSTRACT

Embodiments of the invention are directed to systems and methods for protecting content by automatically identifying a display surface viewable only to authorized users and displaying protected content on the identified display surface. In one example embodiment, content is displayed on a first display surface in viewable range of a first user authorized to view the content. The entrance of a second user into viewable range of the first display surface is detected, and automatically determined to be unauthorized to view the content. A second display surface in viewable range of the first user but not viewable by the second user is automatically identified in response to detecting the entrance of the second, unauthorized user into viewable range of the first display surface. The display of the content is automatically moved from the first display surface to the second display surface to prevent the content from being viewed by the unauthorized user.

17 Claims, 3 Drawing Sheets

(56) References Cited

OTHER PUBLICATIONS

Rachovides et al., "The Conductor Interaction Method", ACM Transactions Multimedia Computing, Communications and Applications, vol. 3, No. 4, Article 27, Dec. 2007, pp. 27:1-27:23.

Wiedenbeck et al., "Design and Evaluation of a Shoulder-Surfing Resistant Graphical Password Scheme", pp. 177-184.

Bednarik et al., "Validating the Restricted Focus Viewer: A study using eye-movement tracking", University of Joensuu, Joensuu, Finland, Behavior Research Methods 2007, 39 (2), pp. 274-282.

* cited by examiner

CONTENT PROTECTION USING AUTOMATICALLY SELECTABLE DISPLAY SURFACES

BACKGROUND

1. Field of the Invention

The present invention relates to displaying content, and more particularly to limiting the display of content to authorized users.

2. Background of the Related Art

Information may be electronically stored in a variety of displayable formats, including images, video, and electronic documents, as generally referred to herein as "content." Content may be displayed and viewed by a user having access to the media on which the content is stored. A range of display types are available for displaying such content, examples of which include desktop and portable laptop computer screens, television displays of various sorts, and projector systems. Much content is private, i.e. intended for or restricted to the use of a particular person, group, or class. Efforts are therefore made to protect private content, to limit viewing of the content to the intended users of the content.

Many situations arise in which a user desires to display and view private content in a public location that is either accessible to the general public or accessible to one or more persons other than the intended viewers of the private content. Common examples wherein private content is desired to be displayed in a public location includes the use of laptop computers in airports or coffee shops. Other locations may be semi-private, such as an individual's office where only the intended users of private content are typically present, but where other person(s) still have access. For example, private content may be displayed in a boardroom normally attended by executives, but accessible by employees other than the executives.

One conventional solution for safeguarding private content is for the intended user(s) to simply use discretion as to when, where and how the content is displayed. For example, a laptop user in a public place may elect not to open certain private documents. The user may alternatively open private content but minimize the size of a display window in which the private content is displayed, or angle the laptop display screen in such a way that the screen is not easily viewable by others. Such manual solutions may be cumbersome or make working with the protected information tedious. Automated solutions also exist, including scrambling or otherwise obscuring a portion of the display to prevent unintended viewers from viewing the content. Such automated solutions often require special hardware, such as glasses worn by a user to de-scramble displayed content.

BRIEF SUMMARY

One embodiment of the present invention provides a method of protecting content using automatically selectable display surfaces. Content is displayed on a first display surface in viewable range of a first user authorized to view the content. The entrance of a second user into viewable range of the first display surface is detected. Whether the second user is authorized to view the content is automatically determined. A second display surface is automatically identified in viewable range of the first user but not in viewable range of the second user in response to determining the second user is unauthorized to view the displayed content. The display of the content is automatically moved from the first display surface to the second display surface.

Another embodiment of the invention provides a protected content display system. A plurality of different display surfaces are at different positions within a defined area. A display device is configured for selectively displaying content on any of the different display surfaces. A controller is configured for detecting the entrance of a user into the defined area, determining the authorization of the user to view the content, and controlling the display device to move the display of the content from a first display surface viewable by the user to a second display surface not viewable by the user in response to determining the user is unauthorized to view the content.

DETAILED DESCRIPTION

Embodiments of the invention are directed to systems and methods for protecting content by automatically identifying a display surface viewable only to authorized users and displaying protected content on the identified display surface. The positions of the authorized and unauthorized users may be obtained remotely, e.g. using a sensor physically separate from the user. The status of each user as being authorized or unauthorized may be automatically determined, for example, by remotely obtaining biometric data and comparing the biometric data to an electronic authorization table associating the authorization of users with their biometric data. The position of each display surface may be characterized in terms of, for example, its location and angular position. A display surface may then be identified which, according to its position and the detected locations of the authorized and unauthorized users, is viewable only to the authorized users.

In one embodiment presented below, a sensor may be used to scan an area and remotely find surfaces that are available as display surfaces, such as using a sensor spaced from the scanned surfaces. The display surfaces may be objects or features of a room, such as walls or furniture, onto which an image representation of content may be projected. In another embodiment, a predefined set of display surfaces having known positions are provided from which to select. For example, projector screens or video displays may be strategically positioned in advance such that different display surfaces are viewable only from certain locations within a defined area, and not viewable from other certain locations within the defined area. In response to determining that an unauthorized user has entered into viewable range of a first display surface, the display of the protected content may then be automatically switched from the first display surface to a second display surface visible only to authorized users.

Figure 1:
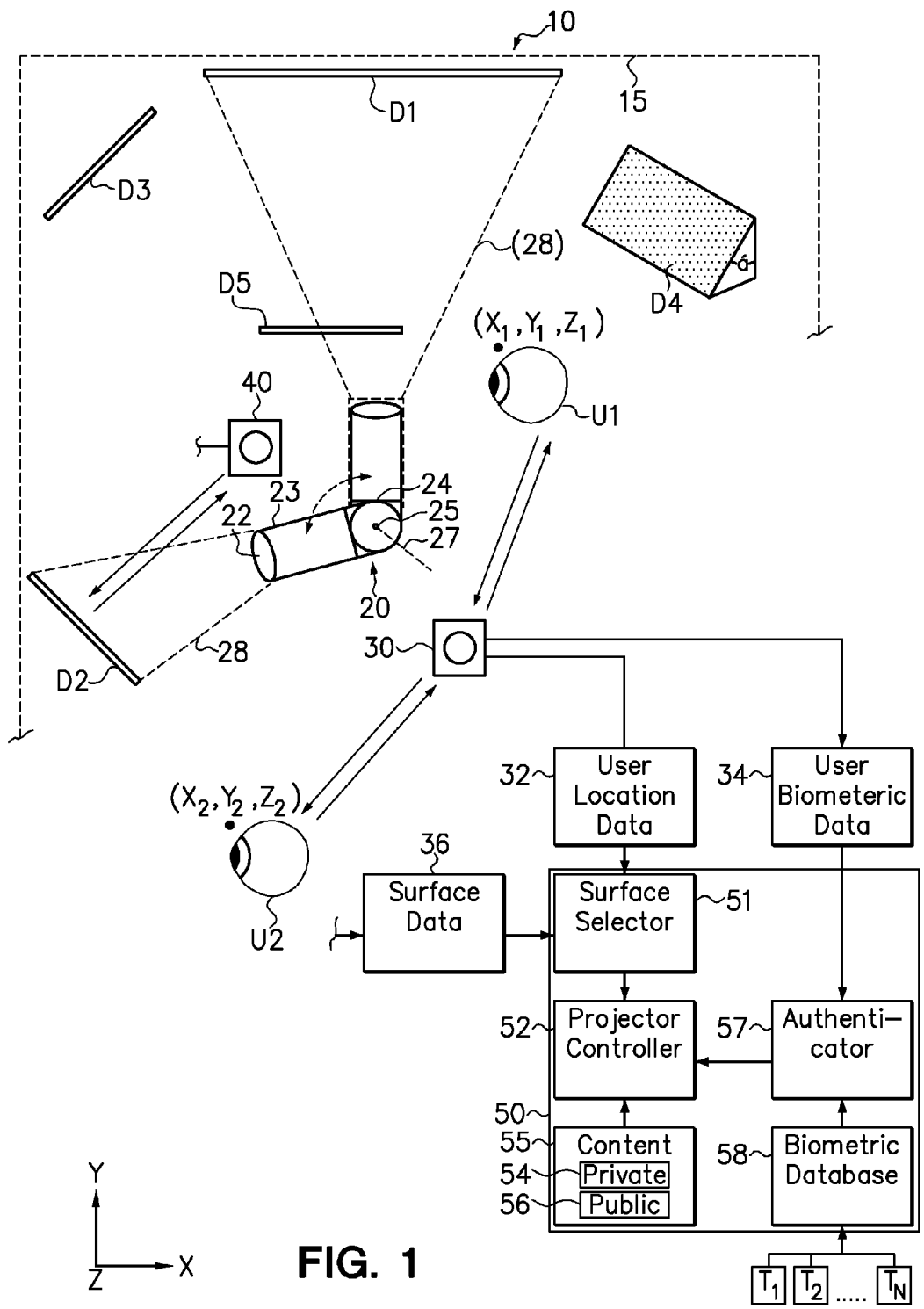
FIG. 1 is a schematic diagram of a projection-based protected content display system according to one embodiment of the invention.

FIG. 1 is a schematic diagram of a projection-based protected content display system 10 according to one embodiment of the invention. The CDS 10 includes a projector system 20 having a moveable lens body 23 for selectively projecting content from a content source 55 onto one or more of a plurality of display surfaces D1 through D5. The content source 55 includes private content 54 and public content 56.

The display surfaces D1-D5 may be any surface within a defined area, such as a room 15, on which a projected image of the content 54, 56 may be displayed. For example, the display surfaces D1-D5 may include one or more projector screens positioned about the room 15. Alternatively, the display surfaces D1-D5 may include surfaces of ordinary objects, such as walls or furniture, onto which an image may be projected. Each display surface D1-D5 is preferably generally flat, but is not required to be flat, as it is possible to project legible images on even curved or uneven surfaces.

The display surfaces D1-D5 are at different positions (e.g. in terms of coordinates and angular orientation) throughout the room 15 for displaying a projected image visible from a variety of different locations about the room 15. The positions of the display surfaces D1-D5 may be predefined, so that a suitable display surface may be selected from among known position of display surfaces D1-D5. Alternatively, the display surfaces D1-D5 and their respective positions may be remotely sensed on an as-needed basis, as discussed below. An XYZ coordinate system is indicated for reference in FIG. 1. An X-Y plane, defined by X and Y axes, is parallel to the sheet of FIG. 1, and a Z axis is orthogonal to the sheet of FIG. 1. The positions of the display surfaces D1-D5 may be differentiated in terms of their XYZ coordinates and/or angular orientation. For example, display surfaces D1 and D5 are parallel but are spaced apart in the Y direction. Display surfaces D1 and D5 may also be at different elevations (Z axis), such that the projector 20 may be angled upwardly to focus on display surface D1 or angled downwardly to instead focus on display surface D5. Display surfaces D2 and D3 are at different angular orientations than display surfaces D1 and D5. Display surfaces D1-D3 and D5 are perpendicular to the X-Y plane, while display surface D4 is transverse to the X-Y plane.

Two users U1 and U2 are schematically shown at different locations in the room 15. The location of authorized user U1 may be represented as point locations $(x_1, y_1, z_1)$ and the location of unauthorized user U2 may be represented as point locations $(x_2, y_2, z_2)$. The point location representing the location of each user U1 and U2 may more particularly identify the locations of an eye of each user U1, U2, in which case the Z coordinate of a user's eye may be a function of the user's height. The first user U1 is authorized to view the private content 54, and is therefore an authorized user with regard to the private content 54. The second user U2 is not authorized to view the private content 56, and is therefore an unauthorized user with regard to the private content 54. Both users U1 and U2 are authorized to view the public content 56, since there are no restrictions on who may view public content 56 in this embodiment. Although FIG. 1 depicts an example scenario involving one authorized user U1 and one unauthorized user U2, the CPS 10 will work with a greater number of users.

The multitude of positions of the available display surfaces makes it possible to identify a display surface that is within viewable range of users for displaying content to some users but not to other users depending on the locations of the users. Whether a display surface is within viewable range depends on whether there is an unobstructed line of sight between one or both of the user's eyes and the display surface. Whether a display surface is within viewable range may also depend on the distance between the user's eyes and the display surface and whether the user is close enough to the display surface to view the display surface with the naked eye. For example, display surface D1 is viewable by both the authorized user U1 and the unauthorized user U2 in the present positions of users U1 and U2 because a direct line of sight is available from each user U1 and U2 to display surface D1 (display surface D5 and projector 20 are assumed to be below a line of sight between user U2 and display surface D1 to provide user U2 with an unobstructed line of sight to surface D1). Thus, display surface D1 is one example of a display surface that is suitable for displaying the public content 56. Display surface D2 is viewable only to the authorized user U1 but not to the unauthorized user U2. Thus, display surface D2 is one example of a display surface that is suitable for displaying the private content 54.

Many different projector configurations are possible for enabling the display of a projected image onto a selected one or more of the display surfaces D1-D5 and for selectively moving the projected image from one display surface to another without having to manually reposition the projector. In the example embodiment of FIG. 1, the projector 20 includes a projector lens 22 mounted in the moveable lens housing 23. The lens 22 generates a beam 28 that carries the image of the content to be projected. The lens housing 23 is movable to aim the beam 28 at a selected one or more of the display surfaces D1-D5. For example, the lens housing 23 may be rotatable about at least a first axis 25 perpendicular to the X-Y plane, and optionally about a second axis 27 transverse to the X-Y plane. The lens housing 23 may also be mounted on a ball-type joint, providing a three-dimensional range of motion to the lens housing 23. Movement of the lens housing 23 may be driven by a motor 24 controlled by a projector controller 52 included with a controller 50. The motor 24 may drive movement of the lens housing 23 up to 360 degrees of rotation, including about each of the first and second axes 25, 27. The motor 24 may also provide some amount of X, Y, and/or Z translation to the lens housing 23. The projector controller 52 controls the motor 24 to aim the beam 28 at the selected display surface D1-D5 and controls the lens 22 to focus the beam 28 on the selected display surface(s) D1-D5.

The moveable lens body 23 of FIG. 1 allows the display of content to be moved from one display surface to an alternate display surface by electronically repositioning the lens body 23. In one alternative embodiment, a moveable projector with a fixed lens body may be used, so that the entire projector is moved to aim the projected image at different surfaces. In another alternative embodiment, multiple projectors may be used, with each projector in a fixed position aimed at a different display surface. For example, five projectors may each be aimed at a different one of the five display surfaces D1-D5. However, the use of fixed projector positions typically entails the use of a predefined set of display surfaces at known positions, so that the display of content would be limited to the predefined set of display surfaces.

A variety of sensor technologies are known in the art that are suitable for detecting human presence and for determining the position of humans. For purposes of illustration, such a system of one or more sensors is schematically represented in FIG. 1 as a user location and biometric sensor 30. For example, the user location and biometric sensor 30 may detect the actual location of a user by generating an electromagnetic beam, such as an infrared or laser beam, and analyzing reflections from the electromagnetic beam to determine the position of the users based on the reflections. A heat-sensing element such as an infrared camera may be included with the user location and biometric sensor 30 to distinguish a human from an inanimate object. In another example, the user location and biometric sensor 30 may include one or more proximity sensors or other position sensors distributed about the room 15. The room 15 may be divided into regions, with proximity sensors positioned to determine which region of the room 15 a user is located. The location data 32 may include an indication of which region a particular user is in. The user location data 32, however determined, may be used for selecting a display surface, as further discussed below.

The user location and biometric sensor 30 also includes sensors and equipment to capture biometric data 34 of users U1 and U2. Various technologies in the field of biometrics are capable of electronically obtaining intrinsic physical traits of a human to identify the human, distinguish one human from another, or to otherwise classify a particular human. Such technologies, known apart from their specific application to the present invention, may be incorporated in obtaining user biometric data 34 for use with various embodiments of the invention. An example of biometric technology is iris recognition, which may be used to remotely analyze the eyes of the users U1 and U2 to obtain iris-related biometric data 34. Example applications of iris recognition techniques and other analyses that may be used to obtain such biometric data and differentiate between users are described in co-pending U.S. Patent Application No. 2009/0273562 to Baliga et al., as presently assigned to International Business Machines of Armonk, N.Y. Other biometric analyses, such as electronic face-recognition or voice recognition, may alternatively be used for remotely identifying a user. One or more of these techniques may be applied for identifying physical traits of a user and matching the identified physical traits with data from a biometric database 58.

The biometric database 58 contains biometric information to which the biometric data 34 may be compared for identifying users as being authorized to view the private content 54. The biometric database may include user-specific biometric templates ($T_1 \ldots T_N$) containing identifiable physical characteristics, such as iris-related data, facial characteristics, or other biometric data. Each template stored in the biometric database 58 may include biometric information specific to each user. The biometric database 58 may contain templates for both authorized and unauthorized users, so that a particular user may be positively identified as authorized or unauthorized. Alternatively, the biometric database 58 may contain templates for only authorized users, so that authorized users may be positively identified and any user not identified as having a template in the biometric database 58 is assumed by default to be unauthorized.

Optionally, an authorized user may be established other than through biometric analysis. For example, in one embodiment, a user providing login credentials to access content may be deemed authorized to view the content irrespective of whether a biometric analysis were performed. In another embodiment, an electronic identification tag, such as a radio frequency identification (RFID) tag could be used to sense the presence of a user within viewable range of certain surfaces. The RFID tag or other identification tag could be remotely readable (i.e. from an electronic card reader physically separated from the user or the RFID tag). The RFID tag or other identification tag could also contain encoded information providing permissions of the user to access and view certain content, and a determination whether to display the content to the user could be made on the basis of such permissions.

Biometric information contained within the database 58 may also be used to distinguish a particular class of user without specifically identifying the user. For instance, such information might identify the gender of a user or whether the user is an adult or a child, where the gender or age of a user is material to whether the user is authorized to view the private content 54. For example, in a particular application, users identified as children may be treated as unauthorized for the purpose of controlling the display of age-restricted content.

An authenticator 57 compares the user biometric data 34 that has been remotely sensed using the user location and biometric sensor 30 to information in the biometric database 58 to determine the authorization of the sensed user to view certain content. The biometric data 34 for a particular user can be matched to a template or other information in the biometric database 58 to determine whether the user is authorized or unauthorized. Where the captured biometric data 34 from a user matches a template, the user may be positively identified as being either authorized or unauthorized. A user may be treated as an unauthorized in the absence of (or prior to) authenticating the user as an authorized user. In one example scenario, a particular company or organization may obtain biometric information for each of its employees (authorized, unauthorized, or both) and store that information in the form of templates in the biometric database 58. Each template may include biometric information for that user, along with associated permissions indicating which content the user is authorized to view. In the embodiment of FIG. 1, authorized users have access to both private content 54 and public content 56, while unauthorized users have access only to public content 56.

The protected content display system 10 automates the selection of available display surfaces D1-D5 so that private content 54 is viewable, if at all, only to authorized users. When an unauthorized user is detected within the viewable region of a display surface upon which private content 54 is currently being displayed, an alternative display surface is selected. If the display surfaces D1-D5 are at predefined, known positions, a mathematical analysis may be applied to determine which of the display surfaces are viewable to each user based on the user location data 32. If the display surfaces and their positions are not predefined, a surface data sensor 40 is provided to scan the room 15 for identifying an alternative display surface for displaying the private content 54.

In one example implementation, the surface data sensor 40 generates an electromagnetic beam, such as an infrared or laser beam to generate reflections off of surfaces in the room 15. The reflections of the electromagnetic beams off a candidate display surface are analyzed to obtain surface data 36 from the candidate display surface. The surface data 36 may include the positions of the identified display surfaces D1-D5, which may be described, for example, using location coordinates describing the location and angular orientation of the surface. The surface data 36 may also include surface features, such as surface roughness, color, or reflectivity, which may be electronically evaluated to determine the suitability of the identified display surface for displaying a projected image according to predefined surface criteria. For example, according to the predefined criteria, a smooth, lighter-colored surface may be favored over a rough, darker-colored surface for displaying a projected image. Alternate techniques for locating and characterizing surfaces known in the art apart from their specific application to the invention may alternatively be used to obtain surface data 36.

The position and orientation of the candidate display surface captured as surface data 36 may be analyzed in conjunction with the user location data 32 to determine if the candidate display surface is viewable by the unauthorized user. In a basic analysis, the location of a user may be approximated by the user's (x,y,z) point location. Based on the point location and the position of the candidate display surface, it may be readily determined whether a direct line of sight is available from the point location to a display surface. If the candidate display surface is determined to have the desired surface criteria and is not viewable to the unauthorized user, the candidate display surface is selected for displaying the private content 54. For example, no line of sight may be constructed from the eye of the unauthorized user U2 to the display surface D2. Thus, in evaluating display surface D2 as a candidate display surface, it is determined that display surface D2 is a suitable candidate for displaying the private content 54 based on the current position of the user U2.

The projected area and perimeter of a projected image may be considered when selecting a candidate display surface to determine if the candidate display surface is large enough for displaying the entire image. To determine the perimeter of a projected image on a candidate display surface without first projecting the image onto the candidate display surface, the distance between the projector lens 22 and that display surface may be ascertained, such as using electromagnetic reflections from the surface data sensor 40. The projected area of the beam 28 may be mathematically determined from the distance between the projector lens 22 and that display surface. Where a beam having a circular cross-section is to be projected perpendicular to a flat display surface, the projected area of the image may be assumed to be circular. However, the beam 28 is not required to be perpendicular to a display surface to project a legible image. Known image correction methodologies may be employed to prevent distortion of the image projected at an angle to the surface.

In an example scenario, only the authorized user U1 was initially present in the room 15. The lens housing 23 was initially in a first position to display private content 54 on the first display surface D1, which is viewable by the authorized user U1. The second user U2 subsequently entered into viewable range of the first display surface D1, such as by entering the room 15. In response to the second user U2 entering into viewable range of the first display surface D1, biometric data 34 from the second user U2 was remotely sensed. The authenticator 57 compared the biometric data 34 to information in the biometric database 58 to identify the second user U2 as being unauthorized. According to the positions of the authorized user U1 and unauthorized user U2, the second display surface D2 was identified as being viewable by the authorized user U1 but not viewable by the authorized user U2. The lens 22 was moved from the first position (aimed at display surface D1) to a second position wherein the beam 28 is aimed at and focused upon a second display surface D2. With the beam 28 now focused on the second display surface D2, the authorized user U1 may continue to view the private content 54, while the content is out of sight of the unauthorized user U2. The display of the private content 54 may be temporarily blocked between the moment the user U2 is identified as being within viewable range of the first display surface D1 and the moment the user U2 is identified as being unauthorized.

Figure 2:
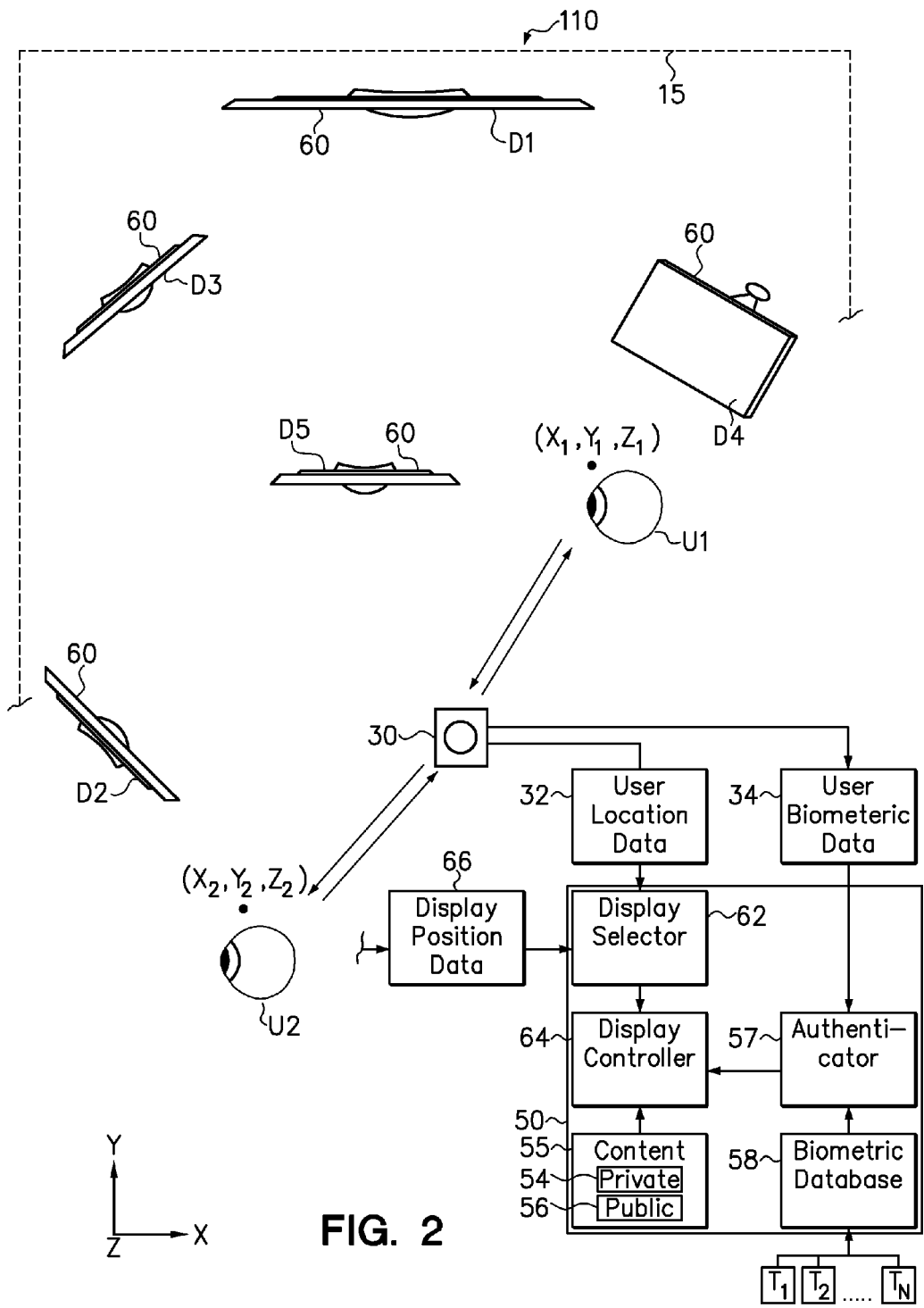
FIG. 2 is a schematic diagram of an alternate embodiment of a protected content display system using fixed-position video displays.

FIG. 2 is a schematic diagram of an alternate embodiment of a protected content display system 110 using fixed-position video displays in lieu of the projector system of FIG. 1. The video displays 60 may be LCD (liquid crystal display) panels, plasma display panels, or CRT (cathode ray tube) based displays, or other type of hardware device having an internal image generator that internally generates the displayed image as opposed to having the image projected from a separate source. For example, the internal image generator of a CRT-based video display comprises a cathode ray tube, and the internal image generator of an LCD-based video display comprises a matrix of liquid crystal display pixels. Each video display 60 defines a respective one of the display surfaces D1-D5. The generally fixed position of video displays 60 allows the positions of the display surfaces D1-D5 to be predefined.

As with the FIG. 1 embodiment, the user location and biometric sensor 30 obtains user location data 32 and biometric data 34 from the users U1 and U2 and inputs the user location data 32 and biometric data 34 to the controller 50. The authenticator 57 then determines whether users are authorized by comparing the user biometric data 34 to the biometric database 58. A display selector 62 selects a video display 60 viewable to authorized users but not to unauthorized users based on the user location data 32 and display position data 66 containing predefined locations of the displays 60. Because each video display 60 is capable of generating its own image of the content 55, no central projector is required as in the FIG. 1 embodiment. Rather, a video display controller 64 is used to direct content 55 to the fixed video display(s) 60 selected the display selector 62. The display controller 64 may direct a first signal carrying the public content 56 to any of the video displays 60. The display controller 64 may direct a separate signal carrying the private content 54 only to one or more of the video displays 60 determined not to be viewable by any unauthorized users.

Figure 3:
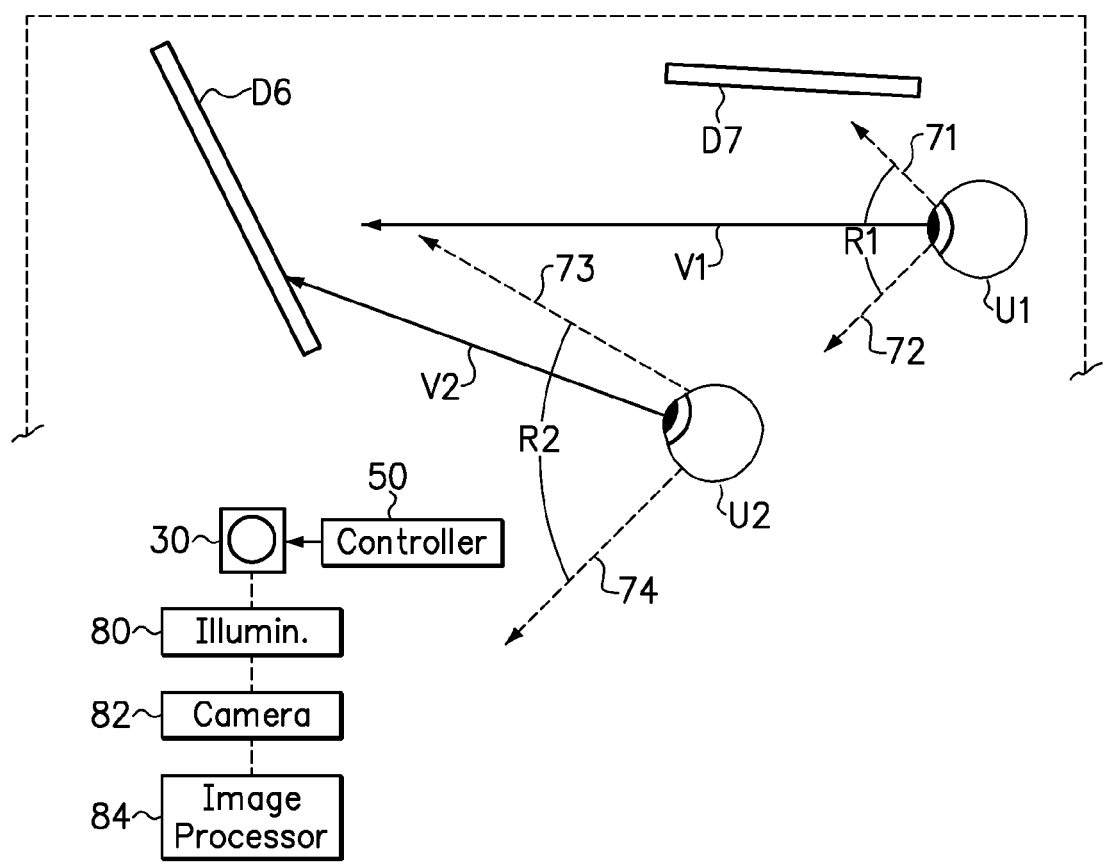
FIG. 3 is a schematic diagram depicting an analysis to determine whether display surfaces are within viewable range of two users.

FIG. 3 is a schematic diagram depicting an analysis to determine whether display surfaces D6 and D7 are within viewable range of users U1 and U2. While a point location representation of a user is useful to determine whether a display surface is viewable to the user based on a line-of-sight analysis, as described above, a more detailed determination of whether a candidate display surface is viewable to a user may be determined by directly analyzing a user's eye position and head position.

A variety of eye-tracking technologies are known in the art, including for determining eye position and head position. The user location and biometric sensor 30 is configured to analyze the eye position and range of eye movement of users U1 and U2. In this example embodiment, the user location and biometric sensor 30 includes an infrared (IR) illuminator 80, an IR tracking camera 82, and an image processor 84. The IR illuminator 80 generates an IR beam that illuminates a user's face. A user's eyes or glasses, if present, generate a comparatively high level of reflection relative to other features of the user's face or body, which may be used to distinguish the location of the eyes from those other features. The IR illuminator 80 may track a user as the user moves about the room 15. The IR camera 82 captures the reflected light from the user's cornea (or glasses, if being worn). The position of the IR camera 82 can be controlled by a motor to also track the user as the user moves about the room 15. The image processor 84 locates the position of the user's eyes by examining the video captured by the IR camera 82. The position of the user's eyes may be determined relative to the user's head, or relative to the room 15.

The position of the user's eyes may be mathematically used to determine whether a surface is viewable by the user. In a basic analysis, a mathematical determination can be made as to whether an unobstructed, direct line of sight may be constructed from the location of the user's eye. If such a line of sight may be constructed, the surface may be deemed viewable by the user. This analysis may conservatively determine that a surface is viewable even if the surface is not viewable, such as if an undetected obstruction lies between the user's eyes and the surface, or if the user's head is in a position that would prevent the user from looking at the surface without moving the user's head. A more detailed analysis may therefore include detecting the position of the user's eyes relative to the user's head to determine whether the surface is viewable by the user. A more detailed analysis may also include computing a gaze vector as generally known in the art, to determine whether the user is actually viewing the surface.

In the example embodiment of FIG. 3, the eye position of users U1 and U2 may be detected to determine that both users U1 and U2 are looking at display surface D6. A biometric analysis of the users' eyes may be performed to determine the gaze vector V1 of user U1 and the gaze vector of user U2. The gaze vectors V1, V2 are both directed at display surface D6, indicating that user U1 and user U2 are both currently viewing display surface D6. Initially, any private content being displayed on display surface D6 may be blocked in response to determining that user U2 is looking at display surface D6. For example, the presence of user U2 may be detected upon entering the room 15, in response to which video content may be paused or turned off until an alternate display surface may be identified.

A candidate display surface D7 may be identified using any of the various techniques described above. The position of the candidate display surface D7 may be analyzed to determine whether it is viewable by the users U1 and U2. Based on the head position and other facial features of users U1 and U2 (omitted for clarity), a hypothetical range R1 of eye motion may be determined for user U1 and a range of eye motion R2 may be determined for user U2. The range of eye motion R1 for user U1 is defined between two maximal gaze positions 71, 72, and the range of eye motion R2 for user U2 is defined between two maximal gaze positions 73, 74. For example, gaze positions 71 and 73 may represent the gaze vectors of users U1, U2 with the eyes of users U1, U2 in a maximal clockwise position. Likewise, gaze positions 72, 74 may represent the gaze vectors of users U1, U2 with the eyes of users U1, U2 in a maximal counter-clockwise position. Based on this analysis, display surface D7 is determined to be viewable by authorized user U1, but not by user U2, which makes display surface D7 a suitable candidate for displaying private content. Thus, by switching the display of private content from display surface D6 to display surface D7, the private content remains protected. This analysis may be performed dynamically, such that if a user's head position changes, the new range of eye motion may be continuously reevaluated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   a sensor detecting an eye position and a head position for each of a first user and a second user;
   displaying content on a first display surface in line of sight of the first user authorized to view the content;
   determining, using the detected eye position and head position of the second user, whether the second user is in line of sight of the first display surface and automatically determining whether the second user is authorized to view the content;
   identifying, using the detected eye position and head position for each of the first user and the second user, a second display surface in line of sight of the first user but not in line of sight of the second user; and
   automatically moving the display of the content from the first display surface to the second display surface in response to determining the second user is in line of sight of the first display surface and is unauthorized to view the displayed content.

2. The method of claim 1, further comprising:
   remotely sensing user biometric data and user location data of the second user in response to detecting the entrance of the second user into line of sight of the first display surface; and
   analyzing the biometric data from the second user to determine whether the second user is unauthorized to view the content; and
   analyzing the user location data from the second user to determine whether the second user is within line of sight of the second display surface.

3. The method of claim 2, further comprising:
   generating a biometric template specific to one or more users, the biometric template containing biometric data uniquely identifying the user; and
   subsequently comparing the sensed user biometric data to the biometric template to determine if the second user is authorized to view the content.

4. The method of claim 1, wherein the step of identifying a second display surface in line of sight of the first user but not in line of sight of the second user further comprises:
   scanning a room to identify one or more candidate display surface that is not predefined, and which is in line of sight of the first user but not in line of sight of the second user.

5. The method of claim 4, further comprising:
   generating an electromagnetic beam to generate reflections off each of the one or more candidate display surface;
   analyzing the reflections of the electromagnetic beam to obtain surface data of each of the one or more candidate display surface; and
   selecting the second display surface from the one or more candidate display surface according to the surface data obtained.

6. The method of claim 5, wherein the step of analyzing the reflections of the electromagnetic beam to obtain surface data further comprises:
   electronically evaluating a surface roughness, color, reflectivity, or combination thereof, to determine the suitability of the candidate display surface for displaying a projected image of the content.

7. The method of claim 1, further comprising:
   determining a size of an image of the content to be projected, without first projecting the image onto the candidate display surface, to determine a candidate display surface that is large enough for displaying an entire projected image of the content.

8. The method of claim 1, wherein displaying the content on a first display surface comprises projecting an image of the content onto the first display surface, and moving the display of the content from the first display surface to the second display surface comprises projecting the image of the content away from the first display surface and onto the second display surface.

9. The method of claim 8, wherein projecting the image of the content away from the first display surface and onto the second display surface comprises moving a moveable projector lens from a first position directed at the first display surface to a second position directed at the second display surface.

10. The method of claim 8, wherein projecting an image of the content onto the first display surface comprises projecting the image of the content using a first projector lens aimed at the first display surface, and moving the display of the content from the first display surface to the second display surface comprises projecting the image of the content using a second projector lens aimed at the second display surface.

11. The method of claim 1, wherein the step of displaying content on a first display surface comprises displaying the content on a first fixed-position video display defining the first display surface and wherein the step of moving the displayed content from the first display surface to the second display surface comprises displaying the content on a second fixed-position video display defining the second display surface.

12. The method of claim 1, wherein the step of identifying a second display surface in line of sight of the first user but not in line of sight of the second user comprises remotely sensing a candidate second display surface spaced from the first display surface and analyzing the position of the candidate second display surface and the location of the second user to determine if the second user is in line of sight of the candidate second display surface.

13. A protected content display system, comprising:
- a plurality of different display surfaces at different positions within a defined area;
- a display device configured for selectively displaying content on any of the different display surfaces; and
- a controller configured for detecting the entrance of a user into the defined area, detecting an eye position and a head position of the user, determining the authorization of the user to view the content, and controlling the display device to move the display of the content from a first display surface in line of sight of the user to a second display surface not in line of sight of the user in response to determining the user is unauthorized to view the content.

14. The protected content display system of claim 13, wherein the display device comprises:
- a projector configured for selectively aiming and focusing at any of the different display surfaces.

15. The protected content display system of claim 13, wherein the display device comprises:
- a plurality of fixed-position video display, each video display having a self-contained image generator for internally generating the image to be displayed.

16. The protected content display system of claim 13, wherein the controller comprises:
- a biometric database containing one or more biometric templates, each biometric template containing biometric data specific to a different user;
- a biometric sensor configured for remotely sensing one or more biometric parameters of the user; and
- an authenticator for comparing the remotely sensed biometric parameters of the user to the biometric templates to determine if the user is authorized to view the displayed content.

17. The protected content display system of claim 13, further comprising:
- a surface data sensor in communication, with the controller and configure for generating an electromagnetic beam to generate reflections off each of the one or more candidate display surface, analyzing the reflections of the electromagnetic beam to obtain surface data of each of the one or more candidate display surface, and control logic on the controller to determine the suitability of each candidate display surface for displaying a projected image of the content.

* * * * *